US008526570B2

(12) United States Patent
Neuser et al.

(10) Patent No.: US 8,526,570 B2
(45) Date of Patent: Sep. 3, 2013

(54) COMPUTED TOMOGRAPHY METHOD, COMPUTER SOFTWARE, COMPUTING DEVICE AND COMPUTED TOMOGRAPHY SYSTEM FOR DETERMINING A VOLUMETRIC REPRESENTATION OF A SAMPLE

(75) Inventors: Eberhard Neuser, Wunstorf (DE); Alexander Suppes, Garbsen (DE); Nils Rothe, Hannover (DE); Michael Hoetter, Gehrden (DE); Anja Frost, Hannover (DE)

(73) Assignee: GE Sensing & Inspection Technologies GmbH, Huerth (DE)

( * ) Notice: Subject to any disclaimer, the term of this patent is extended or adjusted under 35 U.S.C. 154(b) by 0 days.

(21) Appl. No.: 12/953,700

(22) Filed: Nov. 24, 2010

(65) Prior Publication Data

US 2011/0129055 A1      Jun. 2, 2011

(30) Foreign Application Priority Data

Nov. 27, 2009   (EP) .................................. 09014798

(51) Int. Cl.
*A61B 6/00*         (2006.01)
(52) U.S. Cl.
USPC .............................................. 378/4; 382/131
(58) Field of Classification Search
USPC .............................................. 378/4; 382/131
See application file for complete search history.

(56) References Cited

U.S. PATENT DOCUMENTS

| | | | | |
|---|---|---|---|---|
| 4,993,075 A | * | 2/1991 | Sekihara et al. ............... 382/131 |
| 5,253,171 A | * | 10/1993 | Hsiao et al. ...................... 378/4 |
| 5,848,114 A | * | 12/1998 | Kawai et al. ...................... 378/4 |
| 5,953,444 A | * | 9/1999 | Joseph et al. ................. 382/131 |
| 6,768,782 B1 | | 7/2004 | Hsieh et al. |
| 6,795,521 B2 | * | 9/2004 | Hsu et al. .......................... 378/4 |
| 7,570,731 B2 | * | 8/2009 | Nielsen et al. .................... 378/4 |
| 7,693,318 B1 | * | 4/2010 | Stalling et al. ............... 382/128 |
| 8,115,486 B2 | * | 2/2012 | Habara et al. ................. 324/318 |

(Continued)

FOREIGN PATENT DOCUMENTS

| | | |
|---|---|---|
| WO | WO-99/01065 | 1/1999 |
| WO | WO-2004/100070 | 11/2004 |
| WO | WO-2006/018793 | 2/2006 |
| WO | WO-2007/150037 | 12/2007 |

OTHER PUBLICATIONS

Fichtinger, G., et al., "Approximate Volumetric Reconstruction from Projected Images," Proceedings of the 4th International Conference on Medical Image Computing and Computer-Assisted Intervention, 2001; *Lecture Notes in Computer Science*, 2001, pp. 1376-1378, vol. 2208.

*Primary Examiner* — Alexander H Taningco
(74) *Attorney, Agent, or Firm* — Saliwanchik, Lloyd & Eisenschenk

(57) ABSTRACT

A computed tomography method for determining a volumetric representation of a sample comprises using reconstructed volume data of the sample from x-ray projections of the sample taken by an x-ray system, computing a set of artificial projections of said sample by a forward projection from said reconstructed volume data, and determining, essentially from process data of said reconstruction including said reconstructed volume data and/or said x-ray projections, individual confidence measures for single voxels of said volume data based on calculating, for each of said measured x-ray projections, the difference between the contribution of this measured x-ray projection to the voxel under inspection and the contribution from a corresponding artificial projection to the voxel under inspection.

19 Claims, 3 Drawing Sheets

(56) References Cited

U.S. PATENT DOCUMENTS

| | | | |
|---|---|---|---|
| 2003/0128894 A1* | 7/2003 | Bobrov et al. | 382/288 |
| 2003/0235341 A1* | 12/2003 | Gokturk et al. | 382/243 |
| 2005/0105679 A1 | 5/2005 | Wu et al. | |
| 2005/0152590 A1* | 7/2005 | Thieret et al. | 382/131 |
| 2006/0104410 A1 | 5/2006 | Sauer et al. | |
| 2007/0003132 A1* | 1/2007 | Proksa et al. | 382/154 |
| 2007/0183642 A1* | 8/2007 | Ye et al. | 382/131 |
| 2007/0297660 A1* | 12/2007 | Hsieh et al. | 382/131 |
| 2010/0215240 A1* | 8/2010 | Stalling et al. | 382/131 |

* cited by examiner

COMPUTED TOMOGRAPHY METHOD, COMPUTER SOFTWARE, COMPUTING DEVICE AND COMPUTED TOMOGRAPHY SYSTEM FOR DETERMINING A VOLUMETRIC REPRESENTATION OF A SAMPLE

CROSS-REFERENCE TO RELATED APPLICATION(S)

The subject application claims priority under 35 U.S.C. §119(e) of European Patent Application No. 09 014 798.4, filed on Nov. 27, 2009, which is hereby incorporated by reference in its entirety, including any figures, tables, or drawings.

BACKGROUND OF THE INVENTION

The invention relates to a computed tomography method according to the preamble of claim 1, a computer software, a computing device and computed tomography system.

In computed tomography it is a common problem that the inability to distinguish artifacts from real irregularities and structures in the reconstructed volume data can cause misinterpretation of the reconstructed volume data. This can lead for example to detection problems with automated analysis algorithms applied to the reconstructed volume data. The above problem can generally be addressed by determining the quality of the volume data, which is usually done by comparing the reconstructed volume data to pre-stored ideal volume data of an ideal sample taken from a data base. However, this requires knowledge of the material and/or geometry of the sample under inspection, as well as a complex comparing technique. Furthermore, the comparing step itself introduces a further source of artifacts because it is not possible to warp the reconstructed volume data into prefect voxel-to-voxel alignment with the ideal volume data.

G. Fichtinger et al., "Approximate Volumetric Reconstruction from Projected Images", MICCAI 2001, vol. LNCS, no. 2208, p. 1376 discloses a technique for approximate reconstruction for angiography where a surgeon draws silhouettes of a target object in 2D images. The silhouettes are back-projected and from the back-projections of the silhouettes a closest fitting shape covering the object in 3D is determined. Excess parts are carved off using forward projections under the condition that the object should fit inside all silhouettes. Finally, the obtained object is projected forward on to each image plane, where the shadow of the reconstructed object is compared to the silhouettes drawn by the surgeon, so that confidence and consistency of silhouette lines can be calculated and visually interpreted. In this manner, a global measure of the form of the whole drawn silhouette is provided as an indication whether the surgeons' drawings are consistent in all images.

U.S. Pat. No. 6,768,782 B1 discloses a reconstruction method for a CT imaging system where differences between the forward projection samples and the measured projections are used as a basis for updating the reconstructed image and a global optimality of an image is measured from a match of the forward projected image to the measured data. Iterations are aborted depending on a global convergence measure.

WO 99 01065 A1 discloses an iterative cone-beam CT reconstruction method where forward projections of reconstructed data are compared to the originally measured projections.

WO 2006 018793 A1, US 2005 105679 A1, WO 2007 150037 A2, WO 2004 100070 A1 and US 2006 104410 A1 disclose related CT reconstruction methods.

An object of the invention is to provide a computed tomography method capable of generating accurate quality information of the reconstructed volume data, in particular allowing further evaluation of the reconstructed volume data with improved reliability.

Embodiments of the invention solve this object with the features of the independent claims. By calculating individual confidence measures for single voxels of the volume data, the quality and therefore the accuracy of the volume data quality information can be significantly enhanced. A confidence measure, or quality measure, of a particular voxel is a value unambiguously related to the probability that the density value of that voxel is correct, or that it is equal to a pre-defined density value. Alternatively the confidence measure may be related to the variance of the voxel density, the probability that the density value of that voxel is incorrect, an error in the voxel density, deviation to the true density, or the voxel accuracy. The confidence measure of a voxel gives quantitative information about the quality of the reconstructed voxel density. The entity of confidence measures over all voxels results in a confidence measure distribution, or confidence measure map, for the whole reconstructed sample volume.

BRIEF SUMMARY

According to the embodiments of the invention the voxel confidence measures are essentially calculated from process data of the reconstruction, i.e., from data used in the data stream of the reconstruction process between the x-ray projections and the reconstructed volume data, including the reconstructed volume data and the measured x-ray projections. In particular embodiments, no external data have to be used in the calculation of the confidence measure. In further particular embodiments, no pre-stored ideal data of ideal samples or data from a sample database have to be used in the calculation of the confidence measures. Due to this feature of specific embodiments of the invention, the reconstructed volume data do not have to be warped into alignment with ideal volume data with a corresponding inaccuracy, but each individual confidence measure can be exactly and correctly assigned to the corresponding single voxel of the reconstructed volume data.

The invention is not tied to a specific reconstruction method. Therefore, different reconstruction methods can be compared and/or combined on a uniform basis.

In a preferred method of calculating the voxel confidence measures, a set of artificial projections of said sample is computed. The confidence measure can then be computed on the basis of a preferred comparison the artificial projections to the x-ray projections recorded by the x-ray system. A preferred method of calculating the artificial projections is a mathematical forward projection from the reconstructed volume data.

In one embodiment of the invention, values of several or all voxels of the reconstructed volume data are suitably changed prior to the actual computation of the confidence measures. This may contribute to a higher accuracy of the confidence measures calculated in this matter. In this embodiment it may be advantageous to repeat the step of changing the value of voxels of said volume data iteratively.

Different applications of the invention are possible. For example in an automated defect recognition (ADR) system where an ADR algorithm is applied to the reconstructed volume data in order to determine defects in the sample under inspection the detection reliability can be significantly enhanced if the confidence measures are used to distinguish defects from artifacts. In another application the quality information provided by the an embodiment of the invention can be used to improve volume ADR algorithms in their development.

It is also possible to display, for example on a display device, voxels with different confidence measures by different optical indicators. In this manner the voxel confidence level can be directly indicated to an operator by an additional indicator like a color coding, such that the quality of different parts in the reconstructed volume data or volume slices is immediately evident. In another embodiment for example voxels with a confidence measure corresponding to a confidence exceeding a predetermined threshold ("good voxels") and/or voxels with a confidence measure corresponding to a confidence falling below a predetermined threshold ("bad voxels") may be highlighted.

In a further embodiment the quality information provided by the invention can be fed back into the reconstruction process for improving the reconstruction quality or accuracy. In particular, the volume data reconstruction may be iteratively repeated with optimized parameters based on said confidence measures.

Still further advantageous applications of the invention relate to comparing the volume quality for different reconstruction parameters; and volume compression, where different volume regions of the reconstructed volume data can be compressed differently based on their quality as indicated by their confidence measures.

BRIEF DESCRIPTION OF THE DRAWINGS

In the following the invention is described on the basis of preferred embodiments with reference to the accompanying drawings, wherein.

DETAILED DISCLOSURE

Figure 1:
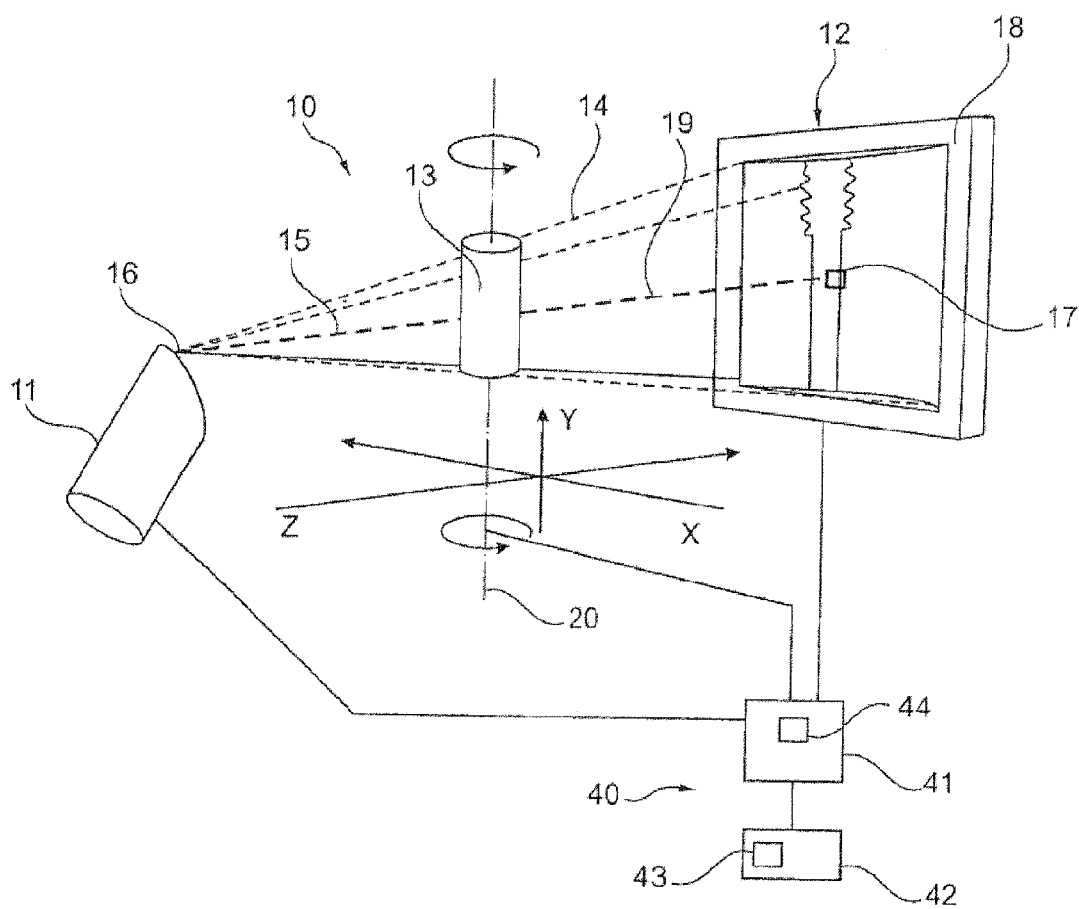
FIG. 1 is a schematic illustration of an embodiment of a computed tomography system in accordance with the subject invention.

The computed tomography system shown in FIG. 1 comprises an x-ray system 10 arranged to take a set of x-ray projections of a sample 13. Therefore, the x-ray system 10 comprises an x-ray source 11, in particular an x-ray tube, emitting an x-ray cone 14, an imaging device 12, in particular an x-ray detector, and a sample manipulator 20 which is preferably adapted to rotate the sample 13 around a vertical axis. The x-ray detector 12 in the present example is a two-dimensional detector, however it is also conceivable to use a one-dimensional detector. A set of x-ray projections of the sample 13 around the full 360° are taken by step-wise rotating the manipulator around a predetermined small angular step and taking an x-ray projection at every rotation angle. An x-ray projection 18, an example of which is shown in FIG. 1, is a one- or two-dimensional image where the measured value $P_i$ of the i-th pixel 17 represents the attenuation of the corresponding x-ray 15 from the focal spot 16 of the source 11 through the sample 13 resulting in a corresponding attenuated x-ray 19 to the pixel 17 under consideration. Therefore, $P_i=\int v(l)\,dl$ where $v(l)$ represents the density of the sample 13 along the path of the x-ray 15 through the volume of the sample 13. The value $P_i$ may typically be a gray value. The aim of the reconstruction is to find the densities $v_n$ of all voxels of the sample volume to be reconstructed, using the following relation of the densities $v_j$ along the path of an x-ray 15 through the sample 13 to the measured value $P_i$ for this x-ray: $P_i=\Sigma_j w_{ij}v_j$ where $w_{ij}$ are weights denoting the relative contribution of the voxel $v_j$ to the measured value $P_i$. In general a set of x-ray projections 21 of a sample 13 is a plurality of x-ray projections 18 taken from different directions, which contains sufficient information to allow reconstruction of the volume structure of the full sample volume by a suited reconstruction technique.

The x-ray system 10 is not limited to rotating a sample holder 20 around a vertical axis. A set of x-ray projections may for example alternatively be obtained by rotating the x-ray system 10 around the fixed sample 13. In general the x-ray system 10 and the sample 13 are suitably movable relative to each other, which may include rotation about one or more vertical and/or horizontal axes for taking a set of x-ray projections. Alternative CT approaches like a tilted rotation axis (<90°) with respect to the beam axis and/or techniques not using a full 360° rotation for taking the set of projections and/or setups with a non constant magnification during taking a set of x-ray projections are possible.

Figure 2:
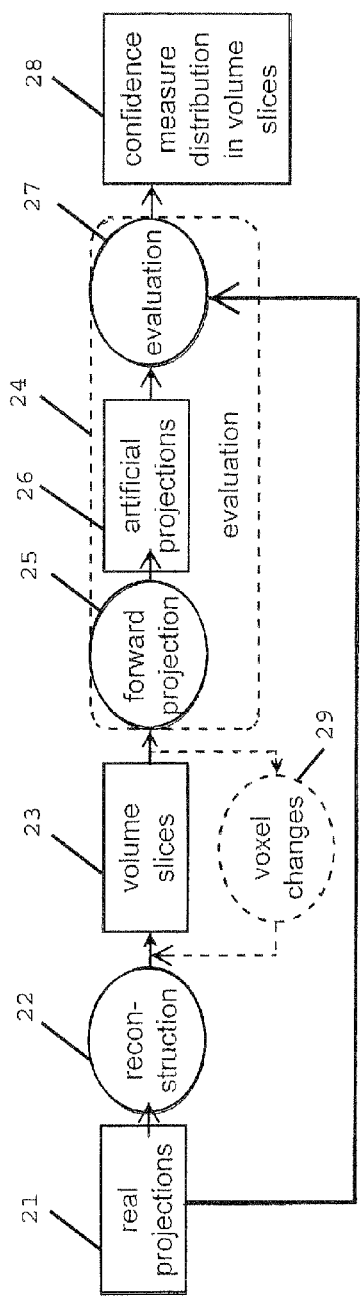
FIG. 2 is a flow diagram illustrating a computed tomography method in general in accordance with an embodiment of the subject invention.

The x-ray projections are read out from the imaging device 12 and sent to a computer apparatus 40 where they are stored in a memory 44 for subsequent evaluation and further processing. The computer apparatus 40 comprises a programmable computing device 41 in particular including a microprocessor or a programmable logic controller, and a user terminal 42 comprising a display device 43. The computing device 40 is programmed with a software for executing the computed tomography method which will be described in the following with reference to FIGS. 2 to 4. Alternatively a separate computer unit may be used to evaluate the x-ray projections taken with the x-ray system 10.

In the embodiment shown in FIG. 1, the computing device 41 is arranged to control the x-ray system 10, in particular the x-ray source 11 and the sample manipulator 20 for taking the x-ray projections 18 of the sample 13. Alternatively a separate control unit may be used to control the x-ray system 10 for taking the x-ray projections 18 of the sample 13.

Figure 5:
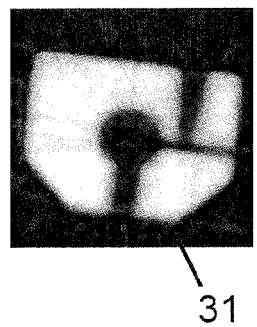
FIG. 5 is a reconstructed volume slice of a sample.

In the computing device 41 the set of x-ray projections 21 taken from the sample 13 with the x-ray system 10 are input to a computed tomography reconstruction algorithm 22. The reconstruction algorithm 22 is adapted to compute reconstructed volume data 23 of the sample 13. In the reconstructed volume data 23, the value $v_n$ of each voxel or volume element represents the attenuation coefficient or density in the corresponding n-th volume element of the sample 13. The complete volume data 23 of a sample 13 is given by a set of subsequent volume slices through the whole sample 13. The reconstruction algorithm 22 is known per se and may be based on any suitable mathematical method, including but not limited to analytical methods like for example Feldkamp or helical reconstruction, iterative methods like algebraic methods, for example ART, SART, etc., or statistical methods like maximum likelihood, etc. An example of a volume slice 31 of a particular sample is shown in FIG. 5.

Based on the reconstructed volume data 23 and the x-ray projections 21 of the sample 13 under inspection, a confidence measure determination process 24 according to the invention is carried out. This may be done in the computing device 41 or alternatively in an independent computing device.

Figure 3:
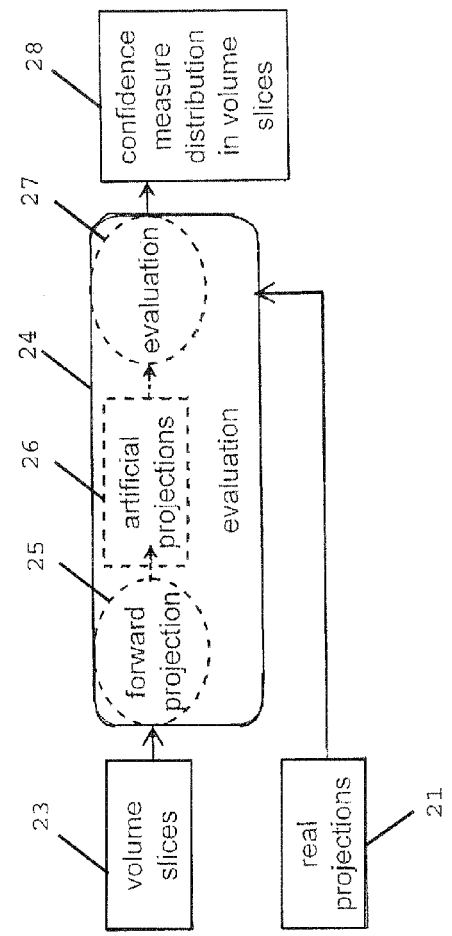
FIG. 3 is a flow diagram illustrating a computed tomography method according to one embodiment.

In a first embodiment shown in FIG. 3, a forward projection 25 is applied to the reconstructed volume slices 23 for generating artificial projections 26 of the sample 13. The forward projection 25 is a mathematical method which simulates the x-ray system 10 shown in FIG. 1 using geometric projection models of a scanner, taking into account the geometry of the x-ray system 10 shown in FIG. 1 in order to make the artificial projections 26 comparable to the x-ray projections 21 recorded with the x-ray system 10. The artificial projections 26 are one- or two-dimensional artificially computed images each having a plurality of pixels.

Based on a comparison between the artificial projections 26 and the x-ray projections 21 recorded with the x-ray system 10, individual confidence measures, or quality measures, for each voxel of the reconstructed volume data 23 are then calculated in a confidence measure calculating step 27.

In more detail, the confidence measure of a voxel may be calculated as follows. For each x-ray projection of the set of real projections 21, the difference $P_i - \Sigma_n w_{in} v_n$ between the contribution $P_i$ of this x-ray projection to the voxel j under inspection and the contribution $\Sigma_n w_{in} v_n$ from a corresponding artificial projection to the voxel j under inspection is calculated. The confidence measure of the voxel under inspection may then be calculated as the squared (or alternatively, for example, absolute) deviation (error) between the measured value $p_i$ and the corresponding reconstructed projection value $\Sigma_n w_{in} v_n$. In particular, the confidence measure of the voxel under inspection may be calculated as the sum over squares of all differences for all x-ray projections 21, as given by the expression $f_j = \Sigma_i (p_i - \Sigma_n w_{in} v_n)^2$. In this case, if the value of the sum $\Sigma_i$ is high, the confidence of the voxel under inspection is low, and vice versa. Alternatively, for example the absolute deviation (error) may be taken as the confidence measure: $f_j = \Sigma_i |p_i - \Sigma_n w_{in} v_n|$. Instead of the density error $f_j$ or in addition, other values directly related to the density error $f_j$ may be taken as confidence measure. For example, the probability that the density assigned to each voxel is correct as given by $\exp(-f_j^2)$ may be used as the confidence measure.

Figure 6:
FIG. 6 is a confidence measure slice of the volume slice shown in FIG. 5.

The entity of confidence measures over all voxels results in a confidence measure distribution 28 for all volume slices, i.e. the complete volume, of the sample 13. In FIG. 6 an example of a confidence measure slice, namely the confidence measure distribution over the volume slice of FIG. 5, is shown, where black pixels correspond to voxels with high confidence and white pixels correspond to voxels with low confidence.

Figure 4:
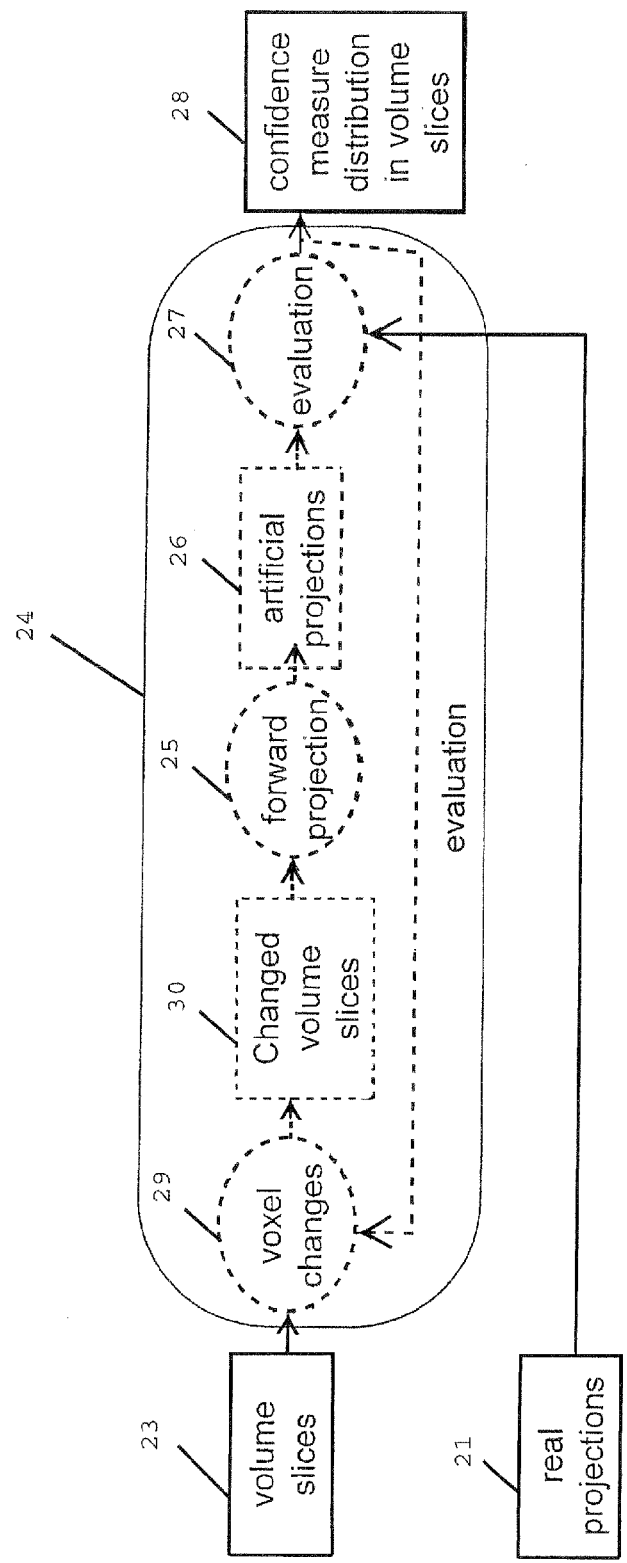
FIG. 4 is a flow diagram illustrating a computed tomography method according to another embodiment.

In a second embodiment shown in FIG. 4 the reconstructed volume data 23 can be individually changed or manipulated in a predetermined manner in a voxel changing step 29 prior to the further processing of the reconstructed volume data. For example, every single voxel of the sample volume can be set to a predetermined specific value in the voxel changing step 29 to generate changed volume data 30, in particular in the form of changed volume slices. In another example every single voxel can be replaced by a set of some predetermined densities.

The forward projection 25 is then applied to the changed volume data 30 for generating artificial projections 26 of the sample 13. To compute confidence measures for voxel elements of a given volume it may be necessary to repeat this step 24 iteratively. The confidence measure calculating step 27 may in this embodiment comprise an intermediate step of calculating a confidence value distribution, i.e. a plurality of confidence values, for each voxel. More specifically, for each variation of the volume density it is determined how much the current value is supported by the corresponding x-ray projection data which yields a probability distribution of the above mentioned support over density value.

The confidence measure for the voxel under inspection is then computed from its confidence value distribution. For example, if for a particular voxel the (absolute) confidence value is small and the others are high, the confidence of that voxel is high. However, if all confidence values of the voxel under inspection are similar within a given range, the confidence of that voxel is low. Generally, the smaller the variance of the confidence value distribution, the higher the support from the measurements and the better the quality of the calculated representations. Another example for the confidence measure may be the maximum value of the probability value distribution.

In a practical embodiment, a plurality of predefined densities vd is considered for each voxel. The hypothetical densities $v_d$ are typically densities which may be expected to be present in the sample 13, for example densities of different typical materials. For each voxel j under inspection, for each predefined density $v_d$ and for each x-ray projection of the set of real projections 21, the difference term $P_i - \Sigma_n w_{in} v_n + (w_{ij} v_j - w_{ij} v_d)$ is calculated, wherein the difference $(w_{ij} v_j - w_{ij} v_d)$ represents the voxel change as performed in step 29. Then, for each voxel the squared (or alternatively, for example, absolute) deviation (error) $f_j(v_d)$ is calculated for each pre-defined density $v_d$ under inspection, in particular as a suited sum $\Sigma_i$ of squares of the above difference terms. Alternatively, for example the absolute deviation (error) may be calculated. Instead of the density error $f_j(v_d)$ or in addition, other values directly related to the density error $f_j$ may be calculated, in particular a probability $\exp(-(f_j(v_d))^2)$ that the density assigned to each voxel is equal to the pre-defined density $v_d$ under inspection. The confidence measure for the voxel under inspection may then be derived from the distribution of the density deviations, or the probabilities, over the different pre-defined densities under inspection. For examples, the confidence measure may be taken as the maximum probability under all probabilities of the different pre-defined densities under inspection. Alternatively or in combination, for example, a measure indicating how pronounced the maximum is in the distribution may be taken as the confidence measure.

The confidence measures 28 of the sample volume may be used in an automated defect recognition (ADR) system where an ADR algorithm is applied to the reconstructed volume data 23 in order to determine defects in the sample 13 under inspection. The ADR system may be realized by an ADR software in the computer apparatus 40.

It is also possible to display, for example on the display device 43 of the computer terminal 42, voxels with different confidence measures by different optical indicators. In this manner the voxel confidence level can be directly indicated to an operator by an additional indicator like a color coding, such that the quality of different parts in the reconstructed volume data or volume slices is immediately evident. In another embodiment for example voxels with a confidence measure corresponding to a confidence exceeding a predetermined threshold ("good voxels") and/or voxels with a confidence measure corresponding to a confidence falling below a predetermined threshold ("bad voxels") may be highlighted.

In a further embodiment the quality information 28 provided by the invention can be fed back into the reconstruction process 22 (see FIG. 2) for improving the reconstruction quality or accuracy. In particular, the volume data reconstruc-

The invention claimed is:

1. A method of using computed tomography for determining a volumetric representation of a sample, comprising:
   receiving reconstructed volume data of a sample from measured x-ray projections of the sample taken by an x-ray system;
   computing a set of artificial projections of the sample by a forward projection from the reconstructed volume data;
   and determining individual confidence measures for single voxels of the reconstructed volume data, wherein determining individual confidence measures for single voxels of the reconstructed volume data comprises calculating, for each of the measured x-ray projections, a difference between a contribution of the measured x-ray projection to the single voxel under inspection and a contribution from a corresponding artificial projection to the single voxel under inspection, wherein the individual confidence measure of a voxel under inspection is calculated from a sum over squares, or a sum over absolute values, of the differences between the contributions of the measured x-ray projections to the voxel under inspection and the contributions from the corresponding artificial projections to the voxel under inspection.

2. The method according to claim 1, further comprising changing a value of voxels of the reconstructed volume data.

3. The method according to claim 2, comprising iteratively repeating the step of changing the value of voxels of the reconstructed volume data.

4. The method according to claim 1, further comprising using the confidence measures in an automated defect recognition procedure applied to the reconstructed volume data.

5. The method according to claim 1, further comprising displaying voxels with different confidence measures by different optical codings.

6. The method according to claim 1, further comprising iteratively repeating the volume data reconstruction based on the determined confidence measures.

7. The method according to claim 1, further comprising performing volume compression based on the determined confidence measures.

8. The method according to claim 1, wherein the individual confidence measure of a voxel under inspection is calculated from a sum over squares of the differences between the contributions of the measured x-ray projections to the voxel under inspection and the contributions from the corresponding artificial projections to the voxel under inspection.

9. The method according to claim 1, wherein the individual confidence measure of a voxel under inspection is calculated from a sum over absolute values of the differences between the contributions of the measured x-ray projections to the voxel under inspection and the contributions from the corresponding artificial projections to the voxel under inspection.

10. The method according to claim 1, wherein receiving reconstructed volume data of a sample from measured x-ray projections of the sample taken by an x-ray system comprises:
    receiving the measured x-ray projections of the sample taken by the x-ray system; and
    computing the reconstructed volume data of the sample.

11. One or more non-transitory computer-readable media having computer-usable instructions embodied thereon for performing a method of using computed tomography for determining a volumetric representation of a sample, comprising:
    receiving reconstructed volume data of a sample from measured x-ray projections of the sample taken by an x-ray system;
    computing a set of artificial projections of the sample by a forward projection from the reconstructed volume data;
    and determining individual confidence measures for single voxels of the reconstructed volume data, wherein determining individual confidence measures for single voxels of the reconstructed volume data comprises calculating, for each of the measured x-ray projections, a difference between a contribution of the measured x-ray projection to the single voxel under inspection and a contribution from a corresponding artificial projection to the single voxel under inspection, wherein the individual confidence measure of a voxel under inspection is calculated from a sum over squares, or a sum over absolute values, of the differences between the contributions of the measured x-ray projections to the voxel under inspection and the contributions from the corresponding artificial projections to the voxel under inspection.

12. The method according to claim 11, wherein the individual confidence measure of a voxel under inspection is calculated from a sum over squares of the differences between the contributions of the measured x-ray projections to the voxel under inspection and the contributions from the corresponding artificial projections to the voxel under inspection.

13. The method according to claim 11, wherein the individual confidence measure of a voxel under inspection is calculated from a sum over absolute values of the differences between the contributions of the measured x-ray projections to the voxel under inspection and the contributions from the corresponding artificial projections to the voxel under inspection.

14. A computing device, programmed, in a non-transitory manner, with instructions for performing a method of using computed tomography for determining a volumetric representation of a sample, comprising:
    receiving reconstructed volume data of a sample from measured x-ray projections of the sample taken by an x-ray system;
    computing a set of artificial projections of the sample by a forward projection from the reconstructed volume data;
    and determining individual confidence measures for single voxels of the reconstructed volume data, wherein determining individual confidence measures for single voxels of the reconstructed volume data comprises calculating, for each of the measured x-ray projections, a difference between a contribution of the measured x-ray projection to the single voxel under inspection and a contribution from a corresponding artificial projection to the single voxel under inspection, wherein the individual confidence measure of a voxel under inspection is calculated from a sum over squares, or a sum over absolute values, of the differences between the contributions of the measured x-ray projections to the voxel under inspection and the contributions from the corresponding artificial projections to the voxel under inspection.

15. The method according to claim 14, wherein the individual confidence measure of a voxel under inspection is calculated from a sum over squares of the differences between the contributions of the measured x-ray projections to the voxel under inspection and the contributions from the corresponding artificial projections to the voxel under inspection.

16. The method according to claim 14, wherein the individual confidence measure of a voxel under inspection is calculated from a sum over absolute values of the differences between the contributions of the measured x-ray projections to the voxel under inspection and the contributions from the corresponding artificial projections to the voxel under inspection.

17. A computed tomography system, comprising:
an x-ray system adapted to take measured x-ray projections of a sample; and
a computing device adapted for using computed tomography for determining a volumetric representation of a sample, comprising:
receiving reconstructed volume data of a sample from measured x-ray projections of the sample taken by an x-ray system;
computing a set of artificial projections of the sample by a forward projection from the reconstructed volume data;
and determining individual confidence measures for single voxels of the reconstructed volume data, wherein determining individual confidence measures for single voxels of the reconstructed volume data comprises calculating, for each of the measured x-ray projections, a difference between a contribution of the measured x-ray projection to the single voxel under inspection and a contribution from a corresponding artificial projection to the single voxel under inspection, wherein the individual confidence measure of a voxel under inspection is calculated from a sum over squares, or a sum over absolute values, of the differences between the contributions of the measured x-ray projections to the voxel under inspection and the contributions from the corresponding artificial projections to the voxel under inspection.

18. The method according to claim 17, wherein the individual confidence measure of a voxel under inspection is calculated from a sum over squares of the differences between the contributions of the measured x-ray projections to the voxel under inspection and the contributions from the corresponding artificial projections to the voxel under inspection.

19. The method according to claim 17, wherein the individual confidence measure of a voxel under inspection is calculated from a sum over absolute values of the differences between the contributions of the measured x-ray projections to the voxel under inspection and the contributions from the corresponding artificial projections to the voxel under inspection.

* * * * *